March 4, 1924.

E. BUGATTI 1,485,366

STARTING DYNAMO FOR MOTOR VEHICLES

Filed Aug. 25, 1921

Inventor.
Ettore Bugatti.
By Henry Ott Jr.
Atty.

Patented Mar. 4, 1924.

1,485,366

UNITED STATES PATENT OFFICE.

ETTORE BUGATTI, OF MOLSHEIM, FRANCE.

STARTING DYNAMO FOR MOTOR VEHICLES.

Application filed August 25, 1921. Serial No. 495,299.

(GRANTED UNDER THE PROVISIONS OF THE ACT OF MARCH 3, 1921, 41 STAT. L., 1313.)

*To all whom it may concern:*

Be it known that I, ETTORE BUGATTI, a subject of the King of Italy, residing at Molsheim, Bas-Rhin, France, have invented certain new and useful Improvements in Starting Dynamos for Motor Vehicles, for which I have filed applications in France, February 25, 1920, No. 510,728; in Great Britain, February 25, 1921; and in Germany, February 24, 1921; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In my U. S. Patent No. 1,143,887, dated June 22, 1915, is set forth the advantages to be obtained by extending the crank shaft outwardly of the flywheel and the clutch by means of a hollow shaft connected with the said flywheel and journaled in a bearing mounted upon an extension disposed upon the rear end of the engine crankcase, this arrangement having for its object to obviate the vibrations or jarring of the flywheel.

According to my present invention, I propose to mount upon the said hollow shaft forming an extension of the crankshaft, a dynamo whose rotor or armature is secured to the said hollow shaft or is actuated by the same. By reason of this disposition, the dynamo is enabled to operate in the usual manner as a generator, the rotor being actuated by the hollow shaft which rotates at the same speed as the crankshaft, but which may also be used as a starter for the motor of the vehicle.

Figure 1:
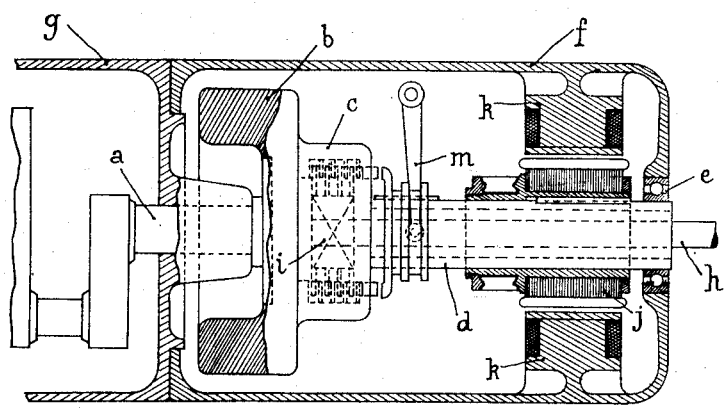
Figure 2:
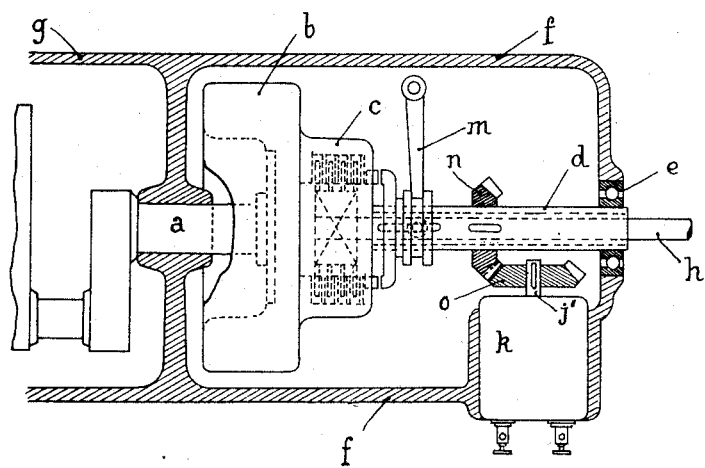

The following description together with the accompanying drawings, which are given by way of example, shows various embodiments of my invention, wherein:

Figure 1 is a longitudinal section of a constructional form of the dynamo device. Figure 2 shows a modified form of the same.

The crankshaft $a$ is connected with the flywheel $b$ which has disposed thereon the clutch disk $c$, this latter being secured to the hollow shaft $d$ whose end is journaled in the bearing $e$ mounted in an extending portion $f$ of the motor crankcase $g$. Within the hollow shaft $d$ is disposed the Cardan shaft $h$, the front Cardan joint $i$ being disposed within the clutch disk. To the shaft $d$ is secured for instance by means of a key, the armature or rotor $j$ whose field or stator is mounted upon the extending portion $f$ of the crankcase.

It will be observed that upon starting the engine, the rotation of the crankshaft will effect the rotation of the armature $j$ which is secured to the hollow shaft connected with the crankshaft $a$, thereby generating electric current which may be collected by the commutator and used in any suitable manner for lighting or storage battery charging.

On the contrary, when the vehicle is stopped, the dynamo is used as a starter, in which case the current is sent by a suitable switch into the armature $j$ whose rotation actuates the shaft $d$ and consequently the crankshaft $a$. When the engine has been started, it will suffice to operate in the known manner upon the clutch fork $m$ in order to effect the rotation of the Cardan shaft $h$.

In the modified form of construction shown in Fig. 2, the dynamo armature is not mounted upon the hollow shaft $d$, but is actuated by means of bevel gears $n$, $o$, the gear wheel $n$ being secured to the hollow shaft $d$ and the gear wheel $o$ being secured to the shaft $j'$ of the armature whose field $k$ is secured to the extending portion $f$ of the crankcase.

The hereinbefore described arrangements will obviate the excessive size of the motor crankcase as in the known devices wherein the dynamo is laterally secured to the engine and is acted upon by the front portion of the crankshaft. Moreover, it is no longer necessary to take account of the conditions of size, inasmuch as the members constituting the dynamo may be given a sufficient size to support the important inertia stresses resulting from the considerable weight of the members in motion at the time of starting.

In the known methods, the dynamo is actuated by gearing or belt from the front part of the engine. Such gearing is subject to severe stresses when accelerating the engine, inasmuch as the shock is sudden and without the interposition of a flywheel of any kind, and where the dynamo is to be likewise used as a starter, it will be necessary to strengthen the actuating gears which are usually employed at the same time for the valve control. As regards starting by belt, this method is known to produce defective results. The device according to my invention has the advantage of being mounted upon a member having a very substantial construction without requiring any strengthening of the latter, and it also permits of reducing the size of the flywheel.

It is obvious that this device may be modified in any suitable manner without exceeding the limits of my invention.

What I claim is:

1. In a starting mechanism, the combination with an engine crank shaft, a hollow shaft alined with and connected thereto, a crank case extension in which the end of the hollow shaft is journalled, a fly-wheel and a clutch on said crank shaft and a dynamo rotor on said hollow shaft and rotating therewith.

2. In a starting mechanism, the combination with an engine frame and a crank shaft mounted therein, a fly-wheel on said crank shaft, a driving shaft and a clutch for connecting the driving and crank shafts; of a hollow shaft connected at one end to said crank shaft and surrounding the driving shaft, a crank case extension in which the other end of said hollow shaft is mounted, a dynamo rotor mounted on said hollow shaft and a co-operating stator mounted in said extension.

In testimony that I claim the foregoing as my invention, I have signed my name.

ETTORE BUGATTI.